United States Patent
Yen et al.

(10) Patent No.: US 7,637,463 B2
(45) Date of Patent: Dec. 29, 2009

(54) HEIGHT-ADJUSTABLE SUPPORT FOR A DISPLAY DEVICE

(75) Inventors: Ching-Hui Yen, Tu-Cheng (TW); Cheng-Feng Wu, Chung-Ho (TW)

(73) Assignee: Syncmold Enterprise Corp., Taipei County (TW)

( * ) Notice: Subject to any disclaimer, the term of this patent is extended or adjusted under 35 U.S.C. 154(b) by 397 days.

(21) Appl. No.: 11/607,269

(22) Filed: Dec. 1, 2006

(65) Prior Publication Data

US 2007/0235601 A1    Oct. 11, 2007

(30) Foreign Application Priority Data

Apr. 11, 2006    (TW) .............................. 95112827 A (51) Int. Cl.
*F16M 11/00*    (2006.01)
(52) U.S. Cl. .................... 248/157; 248/370; 248/278.1; 248/349.1; 248/917; 248/919; 248/920; 248/921; 248/922; 248/371; 248/123.11; 361/679.06; 361/679.21; 361/679.22
(58) Field of Classification Search ................. 248/157, 248/370, 278.1, 349.1, 917, 919, 920, 921, 248/922, 371, 123.11; 361/679.06, 679.21, 361/679.22
See application file for complete search history.

(56) References Cited

U.S. PATENT DOCUMENTS

| | | | | |
|---|---|---|---|---|
| 3,874,309 A | * | 4/1975 | Cowley | ......................... 108/2 |
| 3,903,812 A | * | 9/1975 | Cowley | ......................... 108/2 |
| 3,908,560 A | * | 9/1975 | Horner | ......................... 108/2 |
| 4,768,762 A | * | 9/1988 | Lund | ......................... 267/172 |
| 5,402,690 A | * | 4/1995 | Sekiguchi et al. | ......... 74/490.01 |
| 5,992,809 A | * | 11/1999 | Sweere et al. | ............. 248/278.1 |
| 6,019,332 A | * | 2/2000 | Sweere et al. | ............. 248/284.1 |
| 6,070,839 A | * | 6/2000 | Brenner et al. | ......... 248/123.11 |
| 6,672,553 B1 | * | 1/2004 | Lin | ......................... 248/276.1 |
| 6,874,744 B2 | * | 4/2005 | Rawlings et al. | ....... 248/292.14 |
| 7,252,277 B2 | * | 8/2007 | Sweere et al. | ................ 248/371 |
| 7,369,672 B2 | * | 5/2008 | Hirschhorn | .................. 381/333 |
| 7,494,104 B2 | * | 2/2009 | Baek | ........................ 248/372.1 |
| 2007/0146987 A1 | * | 6/2007 | Sakata et al. | ................. 361/683 |
| 2007/0152125 A1 | * | 7/2007 | Lee | .............................. 248/398 |

* cited by examiner

*Primary Examiner*—J. Allen Shriver, II
*Assistant Examiner*—Nkeisha J Smith
(74) *Attorney, Agent, or Firm*—Rosenberg, Klein & Lee (57) ABSTRACT

A height-adjustable support includes a stand unit, a friction-providing assembly including a stationary member disposed stationarily on the stand unit and a movable member movable relative to and in frictional contact with the stationary member, a link assembly coupled to the movable member such that pivoting movement of the link assembly results in movement of the movable member relative to the stationary member, a mounting seat disposed on a distal end portion of the link assembly and adapted to support a load, and a biasing assembly coupled to the movable member and to the stand unit. A biasing force exerted by the biasing assembly on the movable member and a frictional force generated between the stationary member and the movable member cooperate to balance the weight of the load and position the link assembly to sustain the load at an arbitrary height.

12 Claims, 12 Drawing Sheets

HEIGHT-ADJUSTABLE SUPPORT FOR A DISPLAY DEVICE

CROSS-REFERENCE TO RELATED APPLICATION

This application claims priority of Taiwanese Application No. 095112827, filed on Apr. 11, 2006.

BACKGROUND OF THE INVENTION

1. Field of the Invention

The present invention relates to a support for a display device, more particularly to a height-adjustable support for a display device.

2. Description of the Related Art

Figure 1:
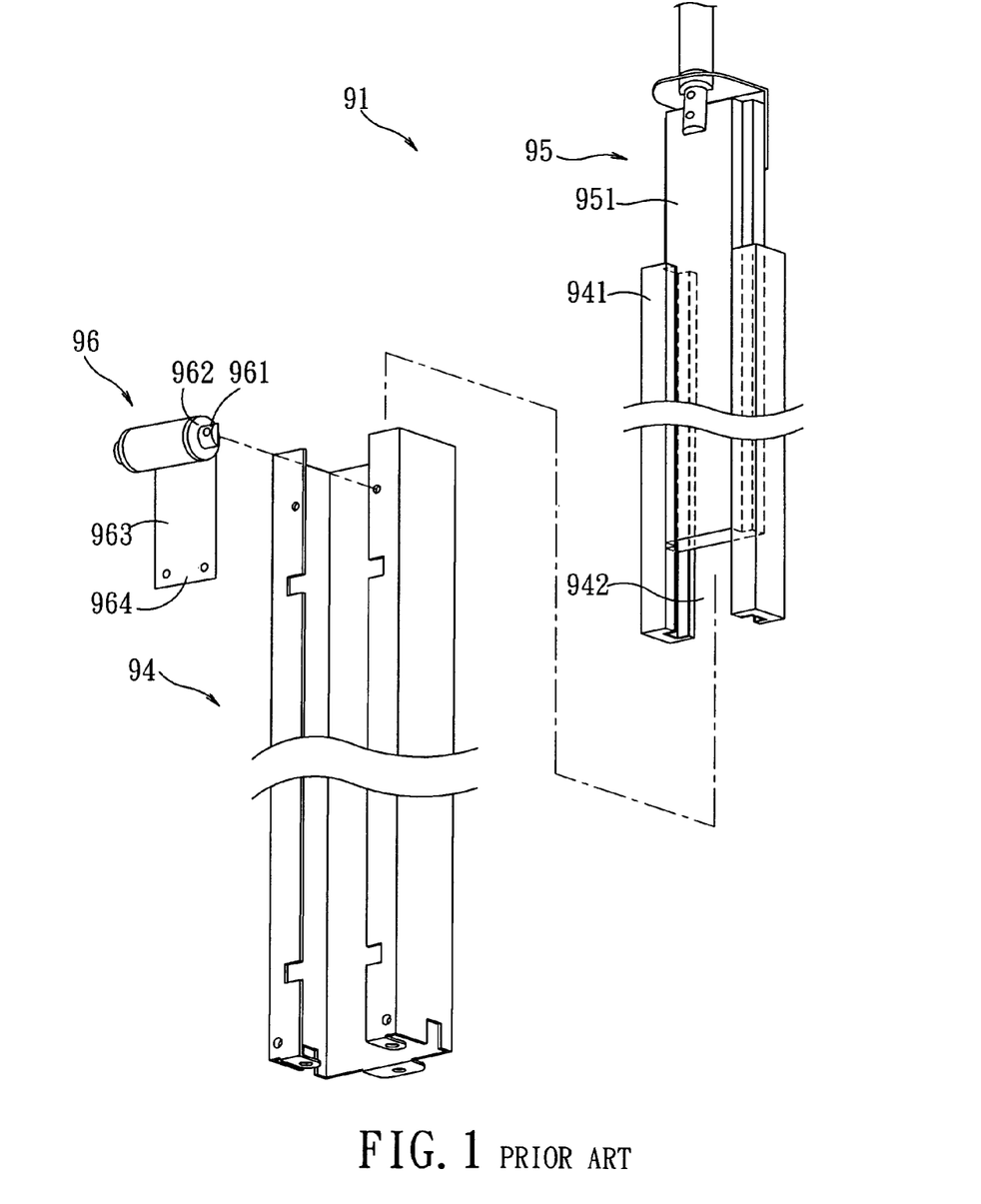
FIG. 1 is an exploded perspective view of a conventional height-adjustable support.
Figure 2:
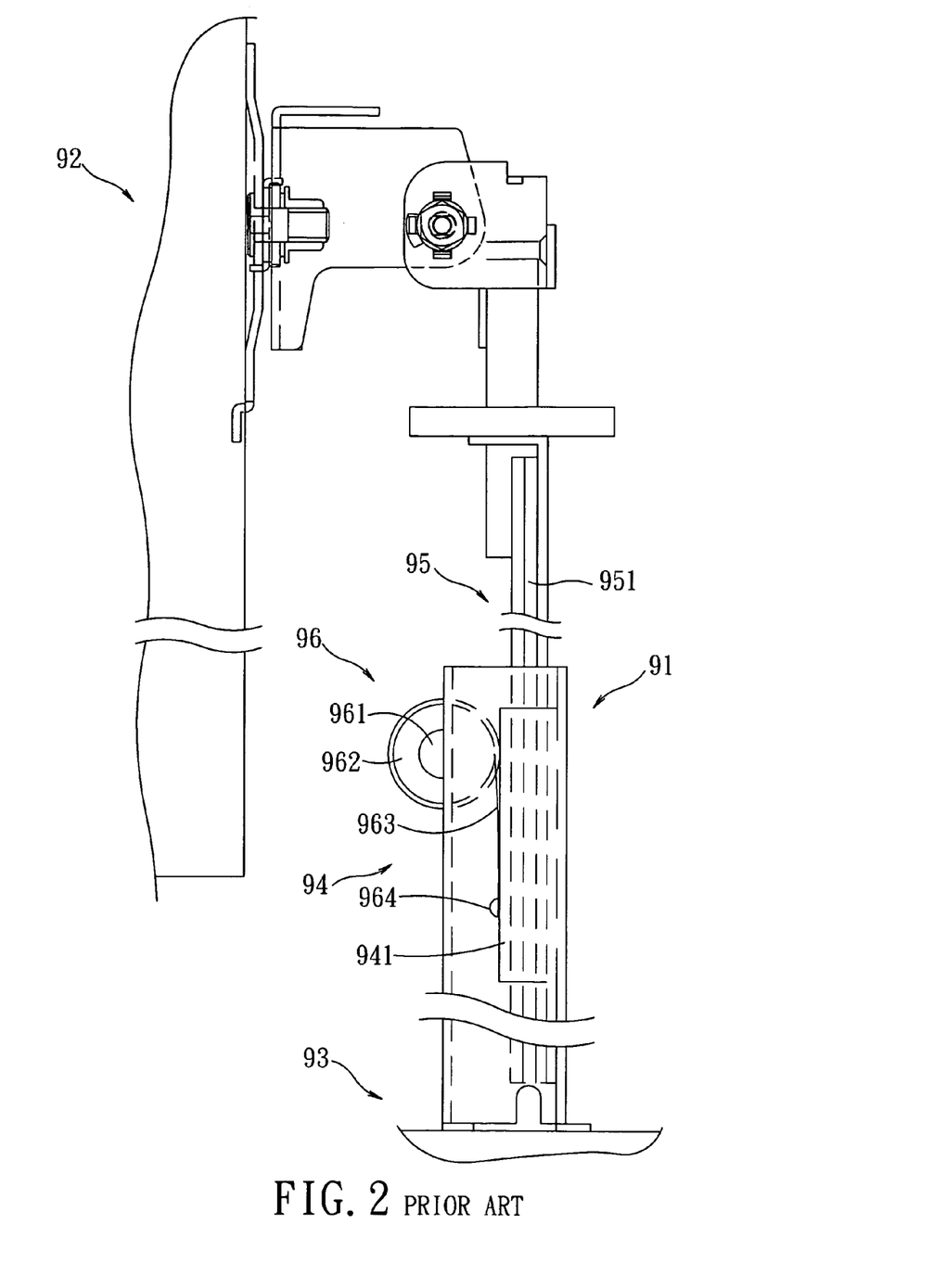
FIG. 2 is an assembled schematic side view of the height-adjustable support of FIG. 1, illustrating the height-adjustable support with a display device mounted thereon.

Referring to FIGS. 1 and 2, a conventional height-adjustable support 91 for a display device 92 includes a base 93 which rests on a support surface (not shown), a stand member 94, a telescopic unit 95, and a balance member 96. A pair of slide members 941 are disposed in the stand member 94, and cooperatively define a slide passage 942 in which a slide plate 951 of the telescopic unit 95 is slidably disposed. The balance member 96 includes a pivot shaft 961 coupled to the stand member 94, a tube 962 sleeved rotatably on the pivot shaft 961, and a resilient plate 963 wound around the tube 962. The resilient plate 963 has an inner end (not shown) secured fixedly to an outer surface of the tube 962, and an outer end 964 coupled to the slide plate 951. The resilient plate 963 provides an upward biasing force to the slide plate 951 sufficient to balance a downward force applied by the combined weight of the slide plate 951 and the display device 92 mounted to an upper end of the slide plate 951.

When it is desired to alter a height of the display device 92, a user presses down or pulls up on either the display device 92 or the telescopic unit 95. Since a state of equilibrium is achieved between the biasing force applied by the resilient plate 963 and the combined weight of the display device 92 and the slide plate 951, the display device 92 is maintained at the position where the user releases the downward or upward force.

The conventional height-adjustable support 91 has the following drawbacks:

1. The telescopic structure described above results in a bulky overall structure, particularly with respect to a profile of the height-adjustable support 91. The weight of the conventional height-adjustable support 91 is also substantial.

2. Since the state of equilibrium described above is dependent solely on the biasing force provided by the resilient plate 963, the elements of the height-adjustable support 91 must be made with extreme precision so that the display device 92 may be balanced, thereby complicating manufacture and increasing the costs associated therewith.

3. Since adjustment of the biasing force of the resilient plate 963 is not possible, the conventional height-adjustable support 91 is not applicable to loads of varying weight, and is suitable to support only the display device 92 of a specific weight.

SUMMARY OF THE INVENTION

The object of the present invention is to provide a height-adjustable support for a display device that is lightweight and has a slim profile, that utilizes cooperation between two mechanisms to balance a load, and that allows for adjustment of the two mechanisms.

The height-adjustable support comprises: a stand unit having an upper end; a friction-providing assembly disposed on the upper end of the stand unit and including a stationary member and a movable member, the stationary member being disposed stationarily on the upper end of the stand unit, the movable member being movable relative to and in frictional contact with the stationary member; a link assembly having a proximal end portion and a distal end portion, the proximal end portion being coupled to the movable member of the friction-providing assembly such that pivoting movement of the link assembly results in movement of the movable member relative to the stationary member; a mounting seat disposed on the distal end portion of the link assembly and adapted to support a load; and a biasing assembly coupled at one end to the movable member of the friction-providing assembly and at an opposite end to the stand unit.

A biasing force exerted by the biasing assembly on the movable member and a frictional force generated between the stationary member and the movable member of the friction-providing assembly cooperate to balance the weight of the load and position the link assembly to sustain the load at an arbitrary height.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
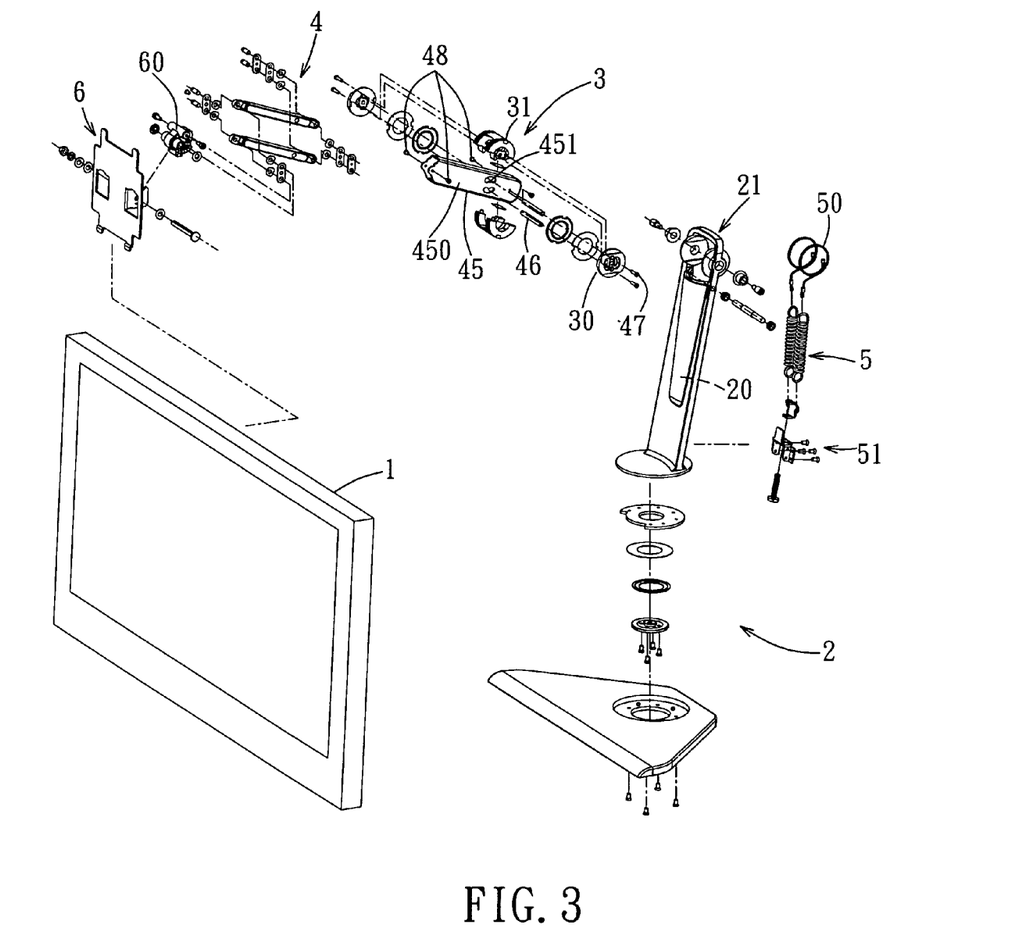
FIG. 3 is an exploded perspective view of a height-adjustable support according to a preferred embodiment of the present invention.

Referring to FIG. 3, a height-adjustable support according to a preferred embodiment of the present invention is used to support a load 1. As an example, the load 1 may be a liquid crystal display device. The height-adjustable support includes a stand unit 2, a friction-providing assembly 3, a link assembly 4, a mounting seat 6, and a biasing assembly 5.

With additional reference to FIG. 4, the stand unit 2 has an upper end 21 and defines a chamber 20 below the upper end 21. The stand unit 2 includes a base 22, and a stand member 23 extending upwardly at an angle from the base 22. The stand member 23 includes spaced-apart left and right stand rods 230, 231. A pair of stand plates 24 are disposed at the upper end 21 of the stand unit 2, that is, at upper ends and inner surfaces of the left and right stand rods 230, 231, respectively. Each of the stand plates 24 has an inner surface 240 formed with a plate-engaging groove 241. The chamber 20 is defined at a center portion of the stand member 23 of the stand unit 2, between the stand rods 230, 231, and extends longitudinally. A cover member 232 may be mounted on or integrally formed with the stand rods 230, 231 to define a front side of the chamber 20.

The friction-providing assembly 3 is disposed on the upper end 21 of the stand unit 2, and includes a stationary member 30 and a movable member 31. The movable member 31 is movable relative to and is in frictional contact with the stationary member 30.

Figure 5:
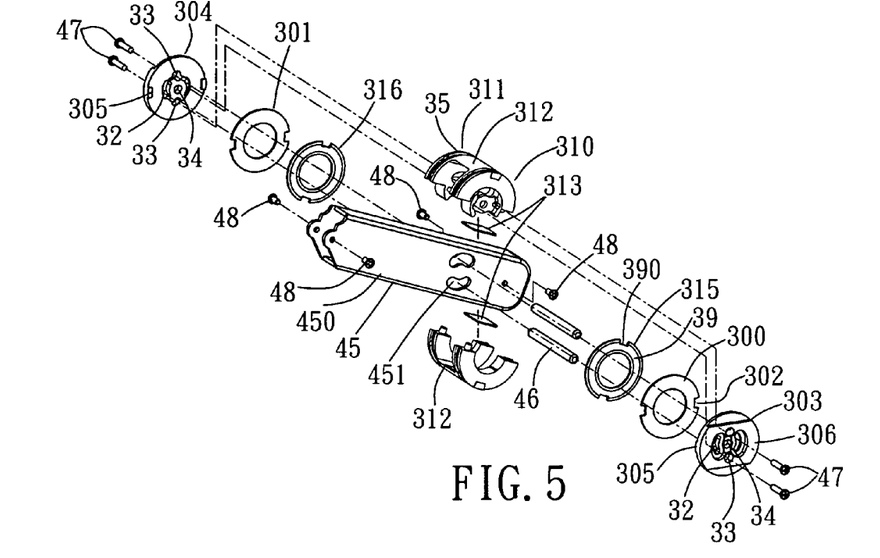
FIG. 5 is an exploded perspective view of a friction-providing assembly and a link assembly of the preferred embodiment.

With further reference to FIG. 5, the stationary member 30 of the friction-providing assembly 3 is disposed stationarily on the upper end 21 of the stand unit 2, and includes a pair of left and right friction plates 301, 300 each having a hollow center, an inner surface, and an outer surface, and each formed with a pair of diametrically opposed first notches 302 in an outer periphery thereof. The stationary member 30 further includes left and right stationary plates 304, 303 each having an inner face and an outer face. The inner faces of the left and right stationary plates 304, 303 are adjacent to the outer surfaces of the left and right friction plates 301, 300, respectively. Each of the left and right stationary plates 304, 303 is formed with a pair of tabs 305 protruding from the inner face thereof. The tabs 305 of each of the left and right stationary plates 304, 303 are engaged respectively with the first notches 302 of the corresponding one of the left and right friction plates 301, 300, such that the left and right friction plates 301, 300 are coupled stationarily and respectively to the inner faces of the left and right stationary plates 304, 303. Further, a catch protrusion 306 is formed on the outer face of each of the left and right stationary plates 304, 303. The catch protrusion 306 of each of the left and right stationary plates 304, 303 is engaged with the plate-engaging groove 241 in the corresponding one of the stand plates 24. Formed through the inner and outer faces of each of the left and right stationary plates 304, 303 are a center hole 34, a pair of spaced-apart pivot holes 32 formed about the center hole 34, and a pair of spaced-apart apertures 33 formed about the center hole 34 and between the pivot holes 32.

Figure 6:
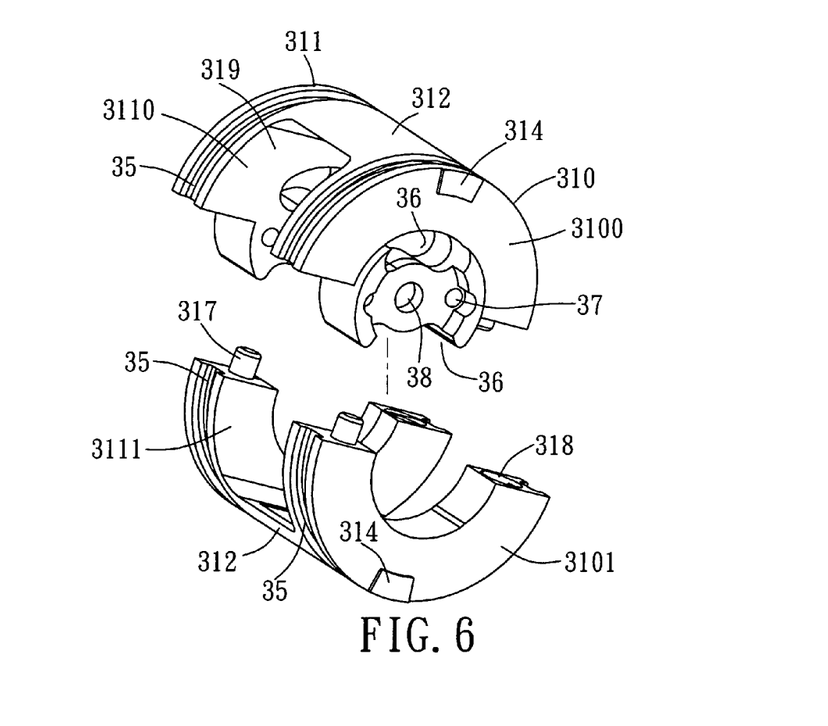
FIG. 6 is an exploded perspective view of a movable member of the friction-providing assembly.

Referring also to FIG. 6, the movable member 31 includes left and right wheels 311, 310, and a pair of arc-shaped bridges 312 extending between the left and right wheels 311, 310 at diametrically opposed positions and from outer peripheries of the left and right wheels 311, 310. A wear-resistant plate 313 (see FIG. 5) is connected to an inner surface of each of the bridges 312. The left wheel 311 is comprised of upper and lower left half wheels 3110, 3111 each having a protuberance (not visible) formed projecting from an outer surface thereof, and the right wheel 310 is comprised of upper and lower right half wheels 3100, 3101 each having a protuberance 314 formed projecting from an outer surface thereof. An assembly of the upper left and right half wheels 3110, 3100 and the corresponding bridge 312 may be coupled to an assembly of the lower left and right half wheels 3111, 3101 through inserts 317 and holes 318 formed on and in opposing surfaces of the left and right wheels 311, 310. When interconnected, a gap 319 is formed among the bridges 312 and the left and right wheels 311, 310.

Figure 7:
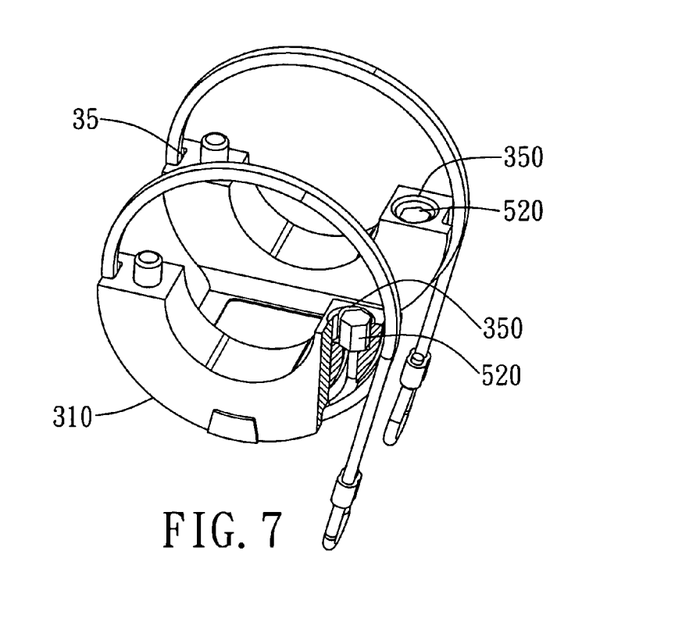
FIG. 7 is a partly sectional perspective view, illustrating coupling between the movable member and the biasing assembly.

A groove 35 is formed in a circumferential surface of each of the left and right wheels 311, 310. As shown in FIG. 7, a sink hole 350 is formed inwardly from each of the grooves 35 in the left and right wheels 311, 310. In this embodiment, each of the upper left half wheel 3110 and the upper right half wheel 3100 is formed with a middle hole 38, an upper pivot slot 36 formed about the middle hole 38, and a pair of spaced-apart first screw holes 37 formed about the middle hole 38 on opposite sides of the pivot slot 36. Further, a lower pivot slot 36 is formed between the upper and lower left half wheels 3110, 3111, and between the upper and lower right half wheels 3100, 3101.

Referring back to FIG. 5, the movable member 31 further includes left and right press plates 316, 315 each having a hollow center, an inner surface, and an outer surface. The inner surface of each of the left and right press plates 316, 315 is adjacent to the outer surface of the corresponding one of the left and right wheels 311, 310, and the outer surface of each of the left and right press plates 316, 315 is adjacent to the inner surface of the corresponding one of the left and right friction plates 301, 300. A projection 39 is formed protruding from the outer surface of each of the left and right press plates 316, 315 to thereby be in contact with the inner surface of the corresponding one of the left and right friction plates 301, 300. Further, second notches 390 are formed in an outer periphery of each of the left and right press plates 316, 315. The protuberances 314 of each of the left and right wheels 311, 310 are engaged respectively with the second notches 390 in a respective one of the left and right press plates 316, 315. As a result, the left and right press plates 316, 315 are co-rotatable with the left and right wheels 311, 310.

It is to be noted that through the relative positioning of the elements of the friction-providing assembly 3 as described above, the left press plate 316 and the left friction plate 301 are interposed between the left wheel 311 and the left stationary plate 304, and the right press plate 315 and the right friction plate 300 are interposed between the right wheel 310 and the right stationary plate 303.

Figure 8:
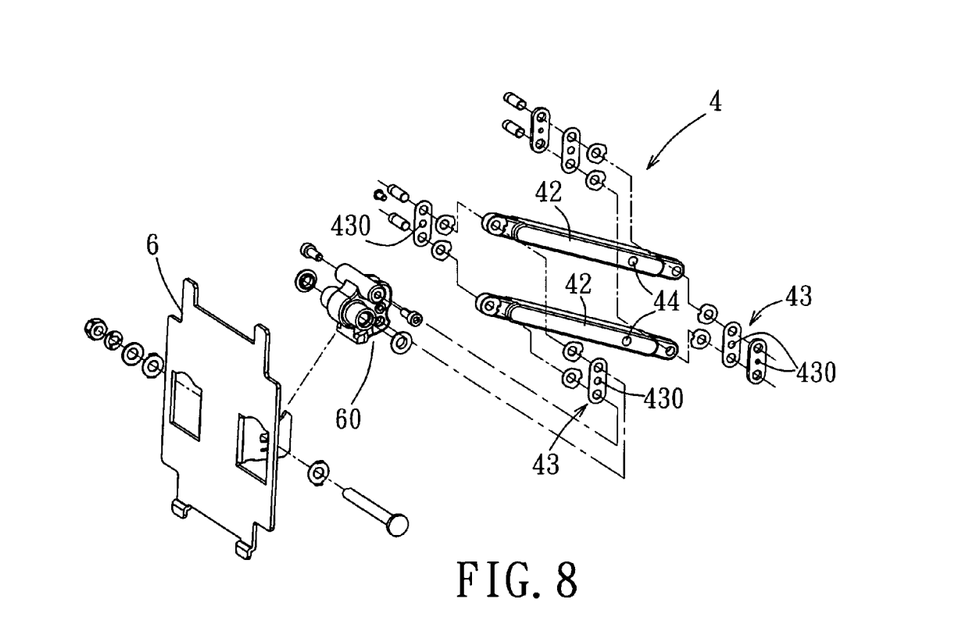
FIG. 8 is an exploded perspective view of the link assembly, a support base, and a mounting seat of the preferred embodiment.

Referring to FIGS. 3, 5, and 8, the link assembly 4 has a proximal end portion and a distal end portion. The proximal end portion is coupled to the movable member 31 of the friction-providing assembly 3 such that pivoting movement of the link assembly 4 results in movement of the movable member 31 relative to the stationary member 30. The link assembly 4 includes a housing 45, a pair of rods 42, a pair of links 43, a pair of pins 46, two pairs of first fasteners 48, and two pairs of second fasteners 47.

The housing 45 has left and right side walls 450. The housing 45 is disposed partly within the gap 319 defined among the bridges 312 and the left and right wheels 311, 310 of the movable member 31 so that the left and right wheels 311, 310 are adjacent respectively to the left and right side walls 450, and so that the wear-resistant plates 313 are interposed respectively between the bridges 312 and the housing 45. Each of the left and right side walls 450 of the housing 45 is formed with a pair of upper and lower passages 451. The upper and lower passages 451 in the left side wall 450 are aligned horizontally and respectively with the upper and lower passages 451 in the right sidewall 450. Further, the upper and lower passages 451 in the left side wall 450 are registered respectively with the upper and lower first pivot slots 36 in the left wheel 311, and the upper and lower passages 451 in the right side wall 450 are registered respectively with the upper and lower first pivot slots 36 in the right wheel 310.

The rods 42 are disposed in the housing 45. Each of the rods 42 has first and second ends, and a pin hole 44 formed between the first and second ends. The first ends of the rods 42 may protrude outwardly of the housing 45.

One of the links 43 is pivotally coupled to the first ends of the rods 42, and the other one of the links 43 is pivotally coupled to the second ends of the rods 42. Each of the links 43 is formed with a through hole 430.

The first fasteners 48 are engaged with the housing 45 and respectively with the through holes 430 in the links 43.

One of the pins 46 is passed through the pin hole 44 in a corresponding one of the rods 42, movably disposed within the upper passages 451 and the upper first pivot slots 36, passed through the centers of the left and right press plates 316, 315, passed through the centers of the left and right friction plates 301, 300, and securely engaged with corresponding ones of the apertures 33 in the left and right stationary plates 304, 303. The other one of the pins 46 is passed through the pin hole 44 in the other one of the rods 42, movably disposed within the lower passages 451 and the lower first pivot slots 36, passed through the centers of the left and right press plates 316, 315, passed through the centers of the left and right friction plates 301, 300, and securely engaged with corresponding ones of the apertures 33 in the left and right stationary plates 304, 303. The pins 46 guide pivoting movement of the housing 45 and the movable member 31 relative to the stationary member 30.

Figure 9:
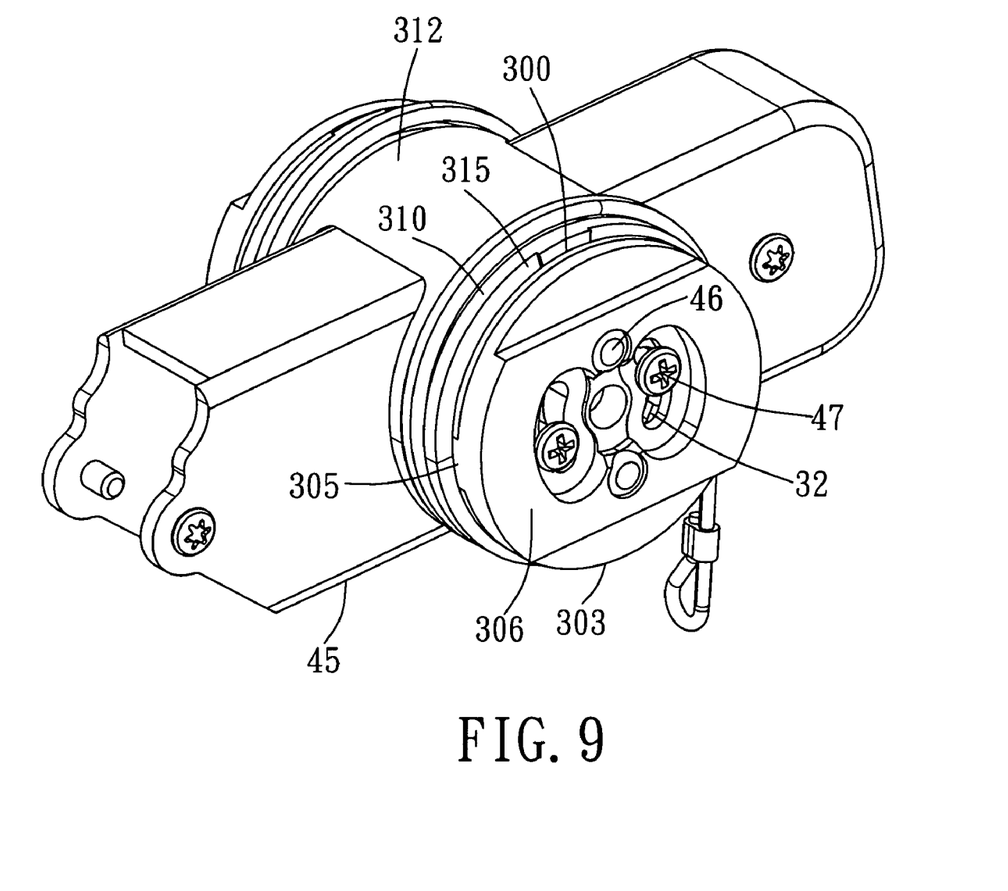
FIG. 9 is an assembled perspective view of the friction-providing assembly and the link assembly of the preferred embodiment.

Referring to FIGS. 5, 6, and 9, the second fasteners 47 are slidably and respectively passed through the second pivot slots 32 in the left and right stationary plates 304, 303, passed through the centers of the left and right friction plates 301, 300 and of the left and right press plates 316, 315, and securely and respectively engaged with the first screw holes 37 in the left and right wheels 311, 310. Adjustment of the second fasteners 47 varies a frictional force generated between the stationary member 30 and the movable member 31, that is, a frictional force generated between the left friction plate 301 and the projection 39 of the left press plate 316, and the right friction plate 300 and the projection 39 of the right press plate 315.

Figure 10:
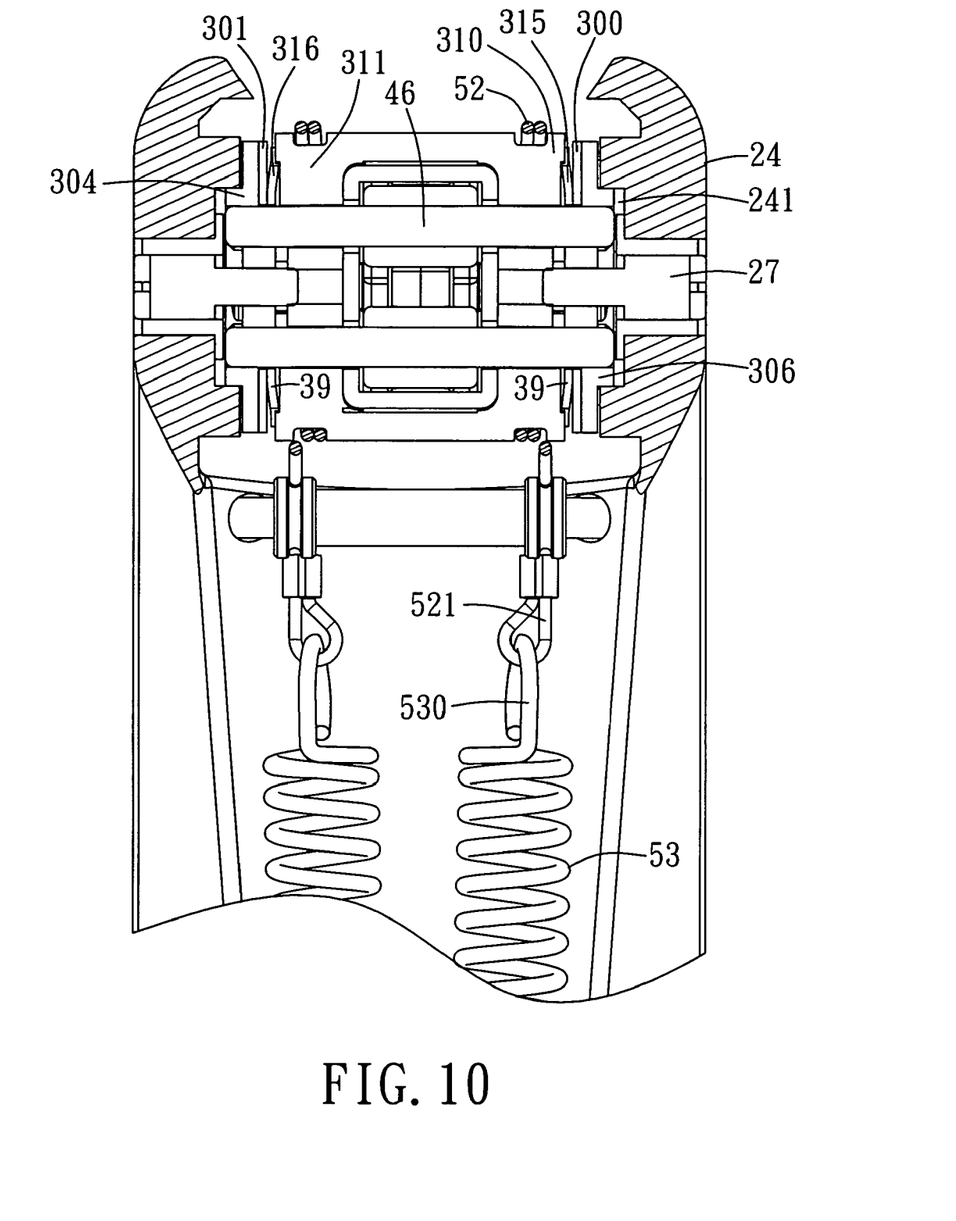
FIG. 10 is a fragmentary sectional view of the preferred embodiment, illustrating coupling between the link assembly and the friction-providing assembly.

Referring to FIG. 10, the stand unit 2 may further include a pair of third fasteners 27 passed through the stand plates 24, passed respectively through the center holes 34 in the left and right stationary plates 304, 303, passed through the centers of the left and right friction plates 301, 300 and of the left and right press plates 316, 315, and engaged respectively with the middle holes 38 in the left and right wheels 311, 310. The third fasteners 27 provide additional support to aid in the pivoting action of the link assembly 4 and the movable member 31 relative to the stationary member 30 and the stand plates 24.

The mounting seat 6, with reference to FIGS. 3 and 8, is disposed on the distal end portion of the link assembly 4. The mounting seat 6 is adapted to support the load 1. In this embodiment, the mounting seat 6 includes a support base 60 mounted to the link 43 coupled to the first ends of the rods 42.

Figure 4:
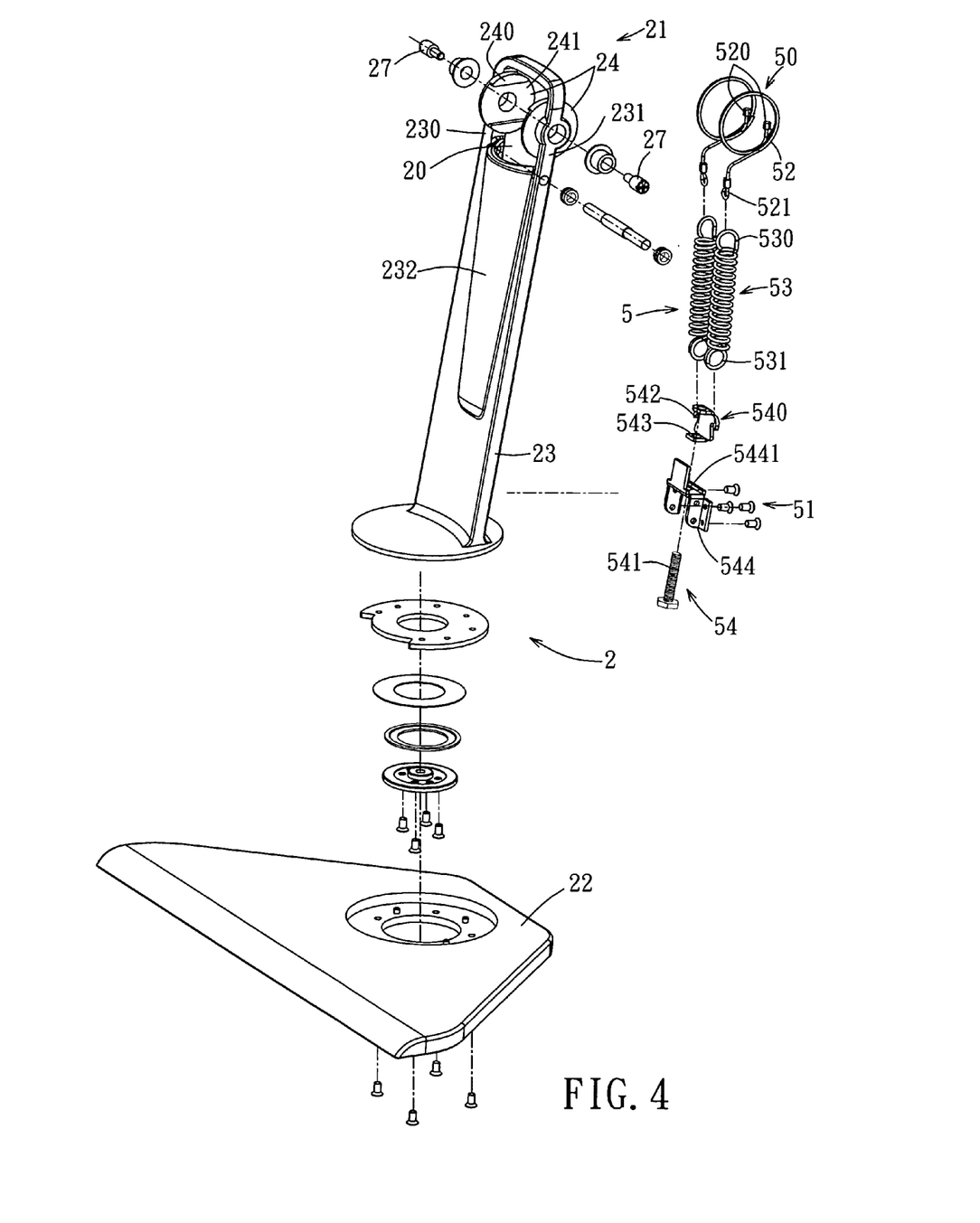
FIG. 4 is an exploded perspective of a stand unit and a biasing assembly of the preferred embodiment.

Referring to FIGS. 4, 6, and 7, the biasing assembly 5 is coupled at one end 50 to the left and right wheels 311,310 of the movable member 31, and at an opposite end 51 to the stand unit 2. The biasing assembly 5 is disposed partially in the chamber 20 of the stand unit 2, and functions to apply a biasing force to the left and right wheels 311, 310 so as to urge the movable member 31 to rotate in a direction so that the housing 45 pivots upwardly. The biasing assembly 5 includes a pair of pull cords 52, a pair of resilient members 53, and an adjusting mechanism 54.

Each of the pull cords 52 has a stop 520 disposed at one end and a hook 521 formed at an opposite end. The pull cords 52 are wound respectively around the grooves 35 in the left and right wheels 311,310, and the stops 520 are securely and respectively engaged with the sink holes 350 in the grooves 35.

Each of the resilient members 53 has a first hook ring 530 formed at one end, and a second hook ring 531 formed at an opposite end and coupled indirectly to the stand unit 2. The first hook rings 530 are coupled respectively to the hooks 521 of the pull cords 52. In this embodiment, each of the resilient members 53 is configured as a coiled tension spring.

The adjusting mechanism 54 includes a stationary bracket 544, a movable bracket 540, and an adjusting member 541. The stationary bracket 544 is coupled stationarily to the stand unit 2 and is formed with a positioning hole 5441. The movable bracket 540 is disposed above the stationary bracket 544 and includes a pair of connectors 542 to which the second hook rings 531 of the resilient members 53 are respectively connected. The movable bracket 540 is formed with a second screw hole 543 that is registered with the positioning hole 5441 in the stationary bracket 544. The adjusting member 541 is passed through the positioning hole 5441 in the stationary bracket 544 and engaged with the second screw hole 543 in the movable bracket 540.

Figure 11:
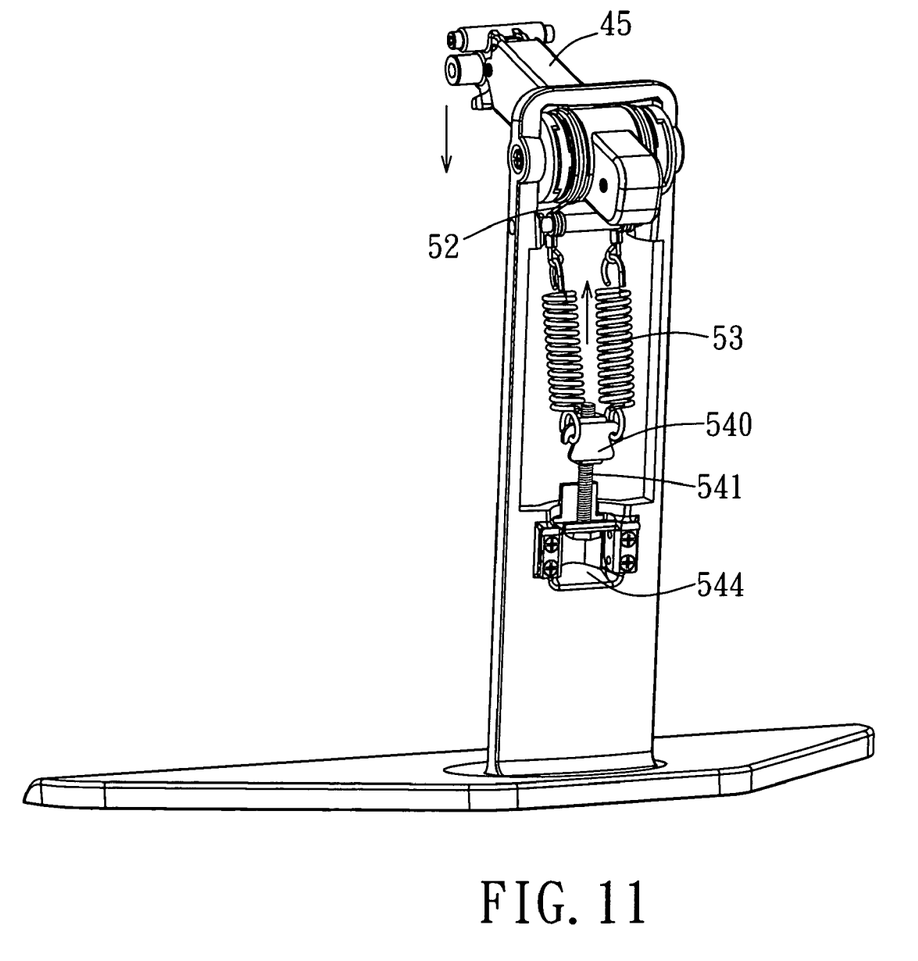
FIG. 11 is a rear perspective view of the preferred embodiment, illustrating upward adjustment of a movable bracket of the biasing assembly.
Figure 16:
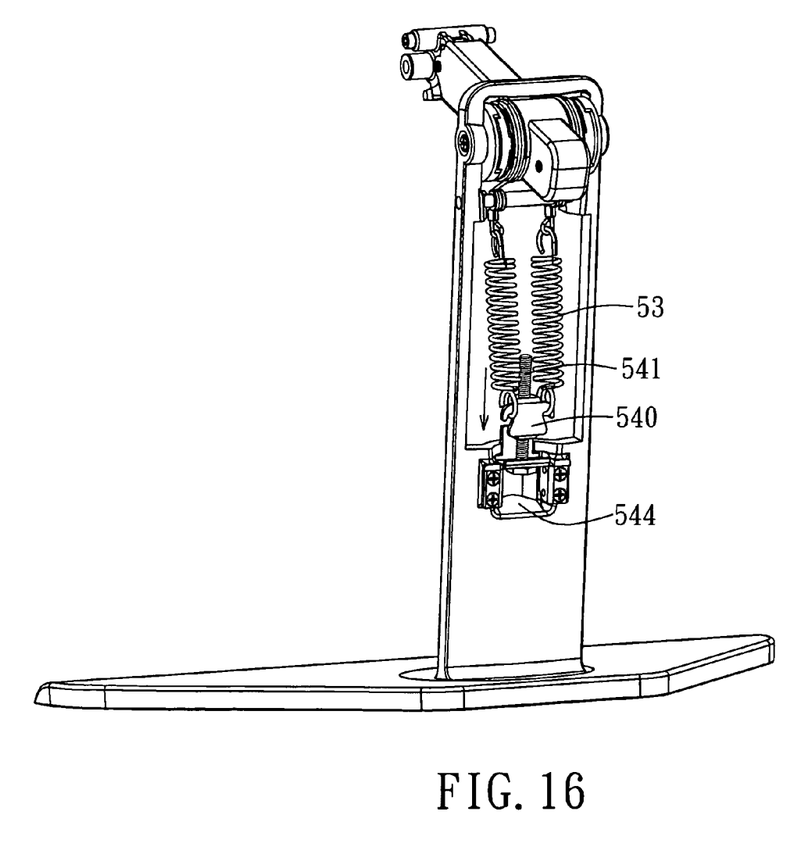
FIG. 16 is a view similar to FIG. 11, but illustrating downward adjustment of the movable bracket of the biasing assembly.

Manipulation of the adjusting member 541 changes a position of the movable bracket 540 relative to the stationary bracket 544, thereby altering tension in the resilient members 53. In FIG. 11, the movable bracket 540 is shown upwardly adjusted relative to the stationary bracket 544 to thereby lessen the tension in each of the resilient members 53. In FIG. 16, the movable bracket 540 is shown downwardly adjusted relative to the stationary bracket 544 to thereby increase the tension in each of the resilient members 53.

Figure 12:
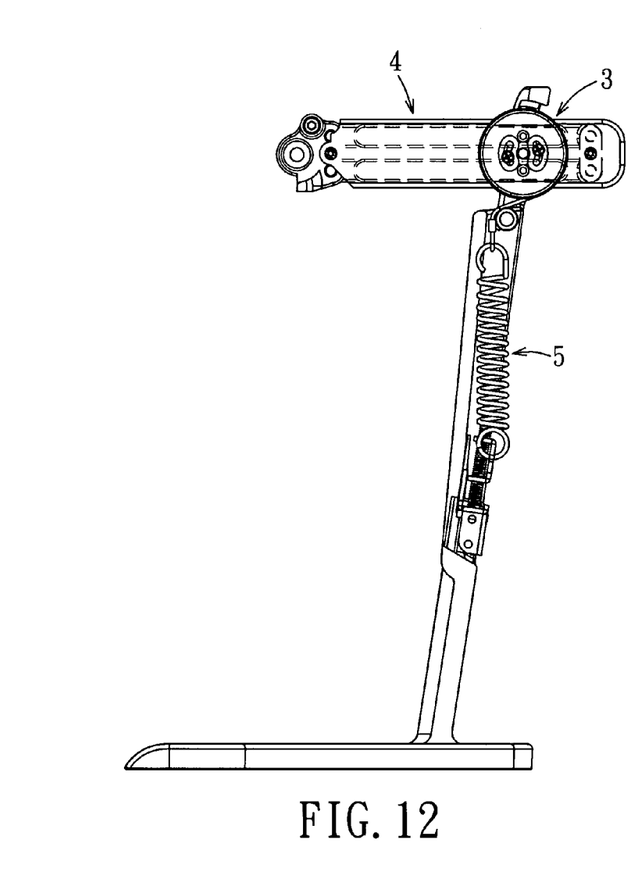
FIGS. 12 and 13 are side views of the preferred embodiment, illustrating the link assembly in different pivoting states.
Figure 13:
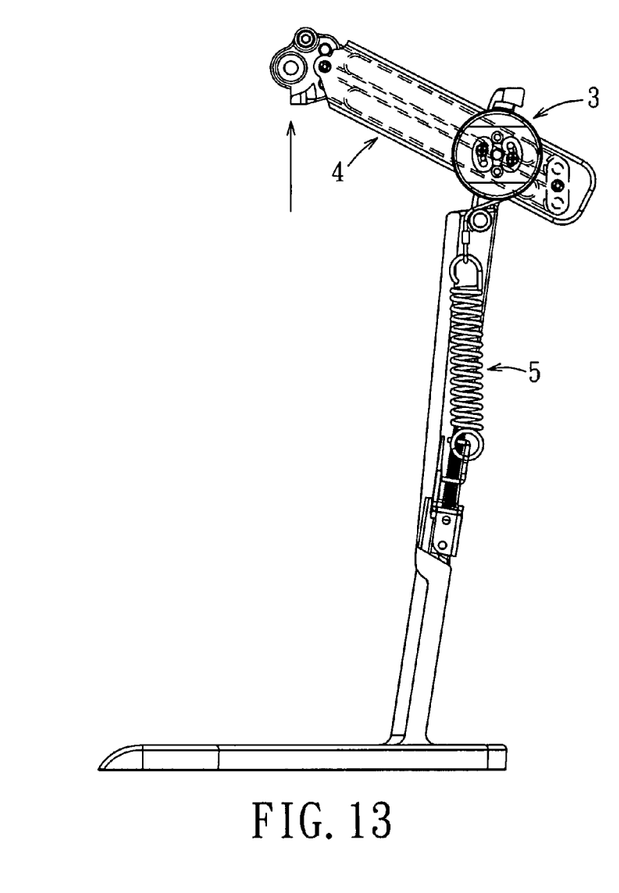
Figure 14:
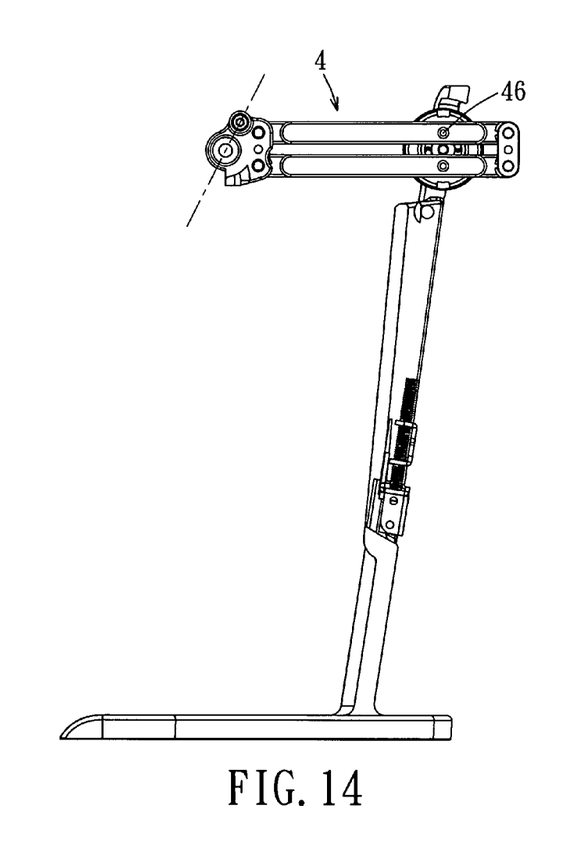
FIGS. 14 and 15 are views similar to FIGS. 12 and 13, respectively, but with a housing removed to better illustrate operation of rods of the link assembly.
Figure 15:
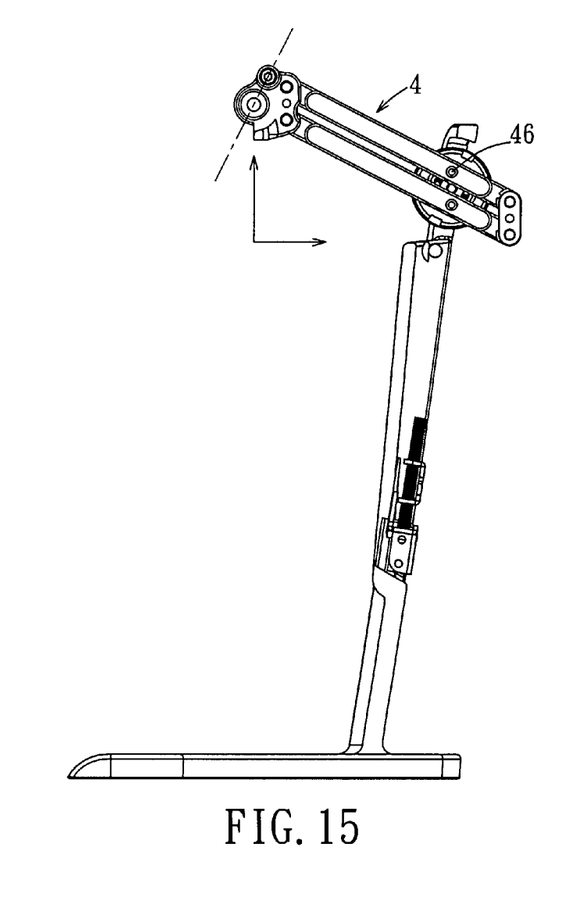

The biasing force exerted by the biasing assembly 5 on the movable member 31 and the frictional force generated between the stationary member 30 and the movable member 31 of the friction-providing assembly 3 cooperate to balance the weight of the load 1 and position the link assembly 4 to sustain the load 1 at an arbitrary height. As a result, by pressing down or pulling up on either the link assembly 4 or the load 1 itself, the height of the load 1 may be adjusted by the user as desired. The link assembly 4 may be adjusted to a lowermost pivoting position shown in FIGS. 12 and 14, an uppermost pivoting position shown in FIGS. 13 and 15, or to any pivoting position between the lowermost and uppermost pivoting positions. The lowermost and uppermost pivoting positions are controlled by lengths of the pivot slots 36 formed in the movable member 31, the passages 451 formed in the housing 4, and the pivot holes 32 formed in the stationary member 30.

The height-adjustable support of the present invention described above has the following advantages:

1. Through the cooperation of the forces supplied by the friction-providing assembly 3 and the biasing assembly 5, balancing of the load 1 need not be performed by reliance on only the biasing assembly 5. As a result, the biasing assembly 5, as well as the friction-providing assembly 3, need not be manufactured to a high degree of precision, thereby ultimately lowering manufacturing costs.

2. Since the biasing force exerted by the biasing assembly 5 and the frictional force generated by the friction-providing assembly 3 are adjustable, these elements of the height-adjustable support again need not be made to a high degree of precision. Further, the height-adjustable support of the present invention may be used to support loads 1 of varying weights.

3. The configuration of the biasing assembly 5 is such that the height-adjustable support of the present invention may be made to have a minimal weight and a slim profile.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A height-adjustable support, comprising:
a stand unit having an upper end;
a friction-providing assembly disposed on said upper end of said stand unit and including a stationary member and a movable member, said stationary member being disposed stationarily on said upper end of said stand unit, said movable member being movable relative to and in frictional contact with said stationary member;
a link assembly having a proximal end portion and a distal end portion, said proximal end portion being coupled to said movable member of said friction-providing assembly such that pivoting movement of said link assembly results in at least rotational movement of said movable member relative to said stationary member;
said link assembly including a housing and a pair of pins, said housing having left and right side walls each formed with a pair of upper and lower passages, said upper and lower passages in said left side wall being aligned horizontally and respectively with said upper and lower passages in said right side wall;
wherein said movable member of said friction-providing assembly includes left and right wheels adjacent respectively to said left and right side walls of said housing, and a bridge extending between said left and right wheels, each of said left and right wheels being formed with a pair of upper and lower pivot slots, said upper and lower pivot slots in said left wheel being registered respectively with said upper and lower passages in said left side wall of said housing, said upper and lower pivot slots in said right wheel being registered respectively with said upper and lower passages in said right side wall of said housing;
a mounting seat disposed on said distal end portion of said link assembly and adapted to support a load; and
a biasing assembly coupled at one end to said movable member of said friction-providing assembly and at an opposite end to said stand unit;
wherein a biasing force exerted by said biasing assembly on said movable member and a frictional force generated between said stationary member and said movable member of said friction-providing assembly cooperate to balance the weight of the load and position said link assembly to sustain the load at an arbitrary height.

2. The height-adjustable support of claim 1, wherein:
one of said pins is movably disposed within said upper passages and said upper pivot slots and engaged securedly with said stationary member of said friction-providing assembly, and the other of said pins being movably disposed within said lower passages and said lower pivot slots and engaged securedly with said stationary member of said friction-providing assembly, said pins guiding pivoting movement of said housing and said movable member relative to said stationary member.

3. The height-adjustable support of claim 2, wherein said link assembly further includes:
a pair of rods disposed in said housing and each having first and second ends, each of said rods being formed with a pin hole between said first and second ends, said pins passing respectively through said pin holes in said rods;
a pair of links one of which is pivotally coupled to said first ends of said rods and the other of which is pivotally coupled to said second ends of said rods, each of said links being formed with a through hole; and
at least one first fastener engaged with said housing and said through hole in one of said links.

4. The height-adjustable support of claim 2, wherein:
said stand unit includes a pair of spaced-apart stand plates disposed at said upper end and each having an inner surface formed with a plate-engaging groove;
said stationary member of said friction-providing assembly includes left and right stationary plates each having an inner face and an outer face, and a catch protrusion formed on said outer face and engaged with said plate-engaging groove in a corresponding of said stand plates, each of said left and right stationary plates being formed with pair of pivot holes and a pair of apertures through said inner and outer faces thereof, said pins being securedly and respectively engaged with said apertures;
each of said left and right wheels of said movable member being further formed with a pair of first screw holes; and
said link assembly further includes two pairs of second fasteners slidably and respectively passed through said pivot holes in said left and right stationary plates, and securedly and respectively engaged with said first screw holes in said left and right wheels, adjustment of said second fasteners varying said frictional force generated between said stationary member and said movable member.

5. The height-adjustable support of claim 4, wherein:
said stationary member of said friction-providing assembly further includes a pair of left and right friction plates having hollow centers through which said pins and said second fasteners pass, said left and right friction plates being coupled stationarily and respectively to said inner faces of said left and right stationary plates; and
said movable member of said friction-providing assembly further includes left and right press plates each having a hollow center through which said pins and said second fasteners pass, and a projection formed protruding from an outer surface thereof, said left and right press plates being coupled respectively to said left and right wheels to be co-rotatable therewith;
said frictional force being generated between said projections of said left and right press plates and said left and right friction plates.

6. The height-adjustable support of claim 5, wherein:
each of said left and right friction plates is formed with a first notch in an outer periphery thereof, and each of said left and right stationary plates is formed with a tab protruding from said inner face thereof and engaged with said first notch in a corresponding one of said left and right friction plates; and each of said left and right press plates is formed with a second notch in an outer periphery thereof, and each of said left and right wheels is formed with a protuberance protruding from an outer surface thereof and engaged with said second notch in a corresponding one of said left and right press plates.

7. The height-adjustable support of claim 2, wherein said biasing assembly is coupled at said one end to at least one of said left and right wheels of said movable member to apply said biasing force to said left and right wheels so as to urge said movable member to rotate in a direction so that said housing pivots upwardly.

8. The height-adjustable support of claim 7, wherein:

a groove is formed in a circumferential surface of one of said left and right wheels of said movable member, and a sink hole is formed inwardly from said groove; and said biasing assembly includes a pull cord having a stop disposed at one end and a hook formed at an opposite end, said pull cord being wound around said groove in said one of said left and right wheels, said stop being securely engaged with said sink hole in said groove, and a resilient member having a first hook ring formed at one end and a second hook ring formed at an opposite end and coupled to said stand unit, said first hook ring being coupled to said hook of said pull cord.

9. The height-adjustable support of claim 8, wherein said resilient member comprises a coiled tension spring.

10. The height-adjustable support of claim 8, wherein said biasing assembly further includes an adjusting mechanism having:

a stationary bracket coupled stationarily to said stand unit and formed with a positioning hole;

a movable bracket disposed above said stationary bracket and including a connector to which said second hook ring of said resilient member is connected, said movable bracket being formed with a second screw hole registered with said positioning hole in said stationary bracket; and an adjusting member passed through said positioning hole in said stationary bracket and engaged with said second screw hole in said movable bracket;

wherein manipulation of said adjusting member changes a position of said movable bracket relative to said stationary bracket, thereby altering tension in said resilient member.

11. The height-adjustable support of claim 2, further comprising a wear-resistant plate interposed between said bridge and said housing.

12. The height-adjustable support of claim 1, wherein one of said ends of said biasing assembly is coupled adjustably to the corresponding one of said movable member and said stand unit such that said biasing force of said biasing assembly is adjustable.

* * * * *

UNITED STATES PATENT AND TRADEMARK OFFICE
CERTIFICATE OF CORRECTION

PATENT NO. : 7,637,463 B2 Page 1 of 1
APPLICATION NO. : 11/607269
DATED : December 29, 2009
INVENTOR(S) : Yen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Twenty-first Day of December, 2010

David J. Kappos
*Director of the United States Patent and Trademark Office*